US009704520B1

(12) United States Patent
Nakamura et al.

(10) Patent No.: US 9,704,520 B1
(45) Date of Patent: Jul. 11, 2017

(54) FLEX-HGA CONNECTOR ASSEMBLY FOR HARD DISK DRIVE

(71) Applicant: Western Digital Technologies, Inc., Irvine, CA (US)

(72) Inventors: Shigeo Nakamura, Kanagawa (JP); Nobumasa Nishiyama, Kanagawa (JP); Takuma Muraki, Kanagawa (JP); Teruhiro Nakamiya, Tokyo (JP)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 15/452,045

(22) Filed: Mar. 7, 2017

(51) Int. Cl.
*G11B 5/48* (2006.01)
*G11B 5/127* (2006.01)

(52) U.S. Cl.
CPC .......... *G11B 5/4853* (2013.01); *G11B 5/1272* (2013.01)

(58) Field of Classification Search
CPC ........ G11B 5/48; G11B 5/4853; G11B 5/1272
USPC ............................................ 360/264.1–264.5
See application file for complete search history.

(56) References Cited

U.S. PATENT DOCUMENTS

| 5,734,523 | A  | * | 3/1998  | Scheidecker | ........ | G11B 5/4853 |
|           |    |   |         |             |          | 360/234.5   |
| 6,703,566 | B1 |   | 3/2004  | Shiraishi et al. | | |
| 7,595,963 | B1 |   | 9/2009  | Chen et al. | | |
| 8,279,560 | B1 |   | 10/2012 | Pan | | |
| 8,295,014 | B1 |   | 10/2012 | Teo et al. | | |
| 9,214,174 | B1 |   | 12/2015 | Pan et al. | | |
| 2003/0099066 | A1 | * | 5/2003 | Kilmer | ................. | G11B 5/4846 |
|           |    |   |         |             |          | 360/264.2   |
| 2005/0237672 | A1 | * | 10/2005 | Kamigama | .......... | G11B 5/4813 |
|           |    |   |         |             |          | 360/265.7   |
| 2008/0024927 | A1 | * | 1/2008 | Hong | ................... | G11B 5/4833 |
|           |    |   |         |             |          | 360/244.2   |
| 2009/0080114 | A1 |   | 3/2009 | Yao et al. | | |
| 2015/0015990 | A1 |   | 1/2015 | Chou et al. | | |

\* cited by examiner

*Primary Examiner* — Allen T Cao
(74) *Attorney, Agent, or Firm* — Kunzler Law Group, PC

(57) ABSTRACT

Described herein is a connector assembly that comprises a head-gimbal assembly (HGA) tail connector, a flex connector, and an adhesive. The HGA tail connector comprises a pad support, an HGA pad coupled to the pad support, and an HGA trace coupled to the pad support and electrically coupled to the HGA pad. The flex connector comprises a substrate, comprising a first side and a second side, where the first side is opposite the second side. The flex connector also comprises a flex pad coupled to the first side of the substrate, a flex trace coupled to the second side of the substrate, and a via extending through the substrate from the first side to the second side. The via electrically couples the flex pad and the flex trace. Also, the adhesive adheres the HGA pad of the HGA connector in electrical contact with the flex pad of the flex connector.

20 Claims, 9 Drawing Sheets

FLEX-HGA CONNECTOR ASSEMBLY FOR HARD DISK DRIVE

FIELD

This disclosure relates generally to hard disk drives, and more particularly to the connection between a head-gimbal assembly (HGA) tail connector and a flex connector of a hard disk drive.

BACKGROUND

A conventional hard disk drive (HDD) includes a head-gimbal assembly (HGA) that is operable to read data from and write data to a magnetic storage disk. The head-gimbal assembly is supported on an arm that adjustably positions the HGA over a surface of the magnetic storage disk. Electronic signals necessary for operation of the HGA are communicated from a controller located off of the arm. A flex connector, electrically coupled with the controller, and an HGA connector, electrically coupled with the HGA, are physically and electrically coupled together to establish a signal communication line between the controller and the HGA. Due to micro-scale sizes of the components of the flex connector and HGA connector, space constraints within the HDD, and large number of electrical connections needed to operate the HGA, establishing strong, reliable, and signal-noise resistant electrical connections between the flex connector and HGA connector can be difficult.

SUMMARY

A need exists for a connector assembly, and associated HDD and method of manufacture, for electrically connecting a controller and an HGA that overcomes the shortcomings of prior art connection assemblies. The subject matter of the present application has been developed in response to the present state of HDD art, and in particular, in response to problems and needs in the HDD art, such as those discussed above, that have not yet been fully solved by prior art techniques. Accordingly, the embodiments of the present disclosure provide a connector assembly, and associated HDD and method of manufacture, that promotes the establishment of strong, reliable, and signal-noise resistant electrical connections between a flex connector and an HGA connector so as to overcome at least some of the shortcomings of the prior art.

Described herein is a connector assembly that comprises a head-gimbal assembly (HGA) tail connector, a flex connector, and an adhesive. The HGA tail connector comprises a pad support, an HGA pad coupled to the pad support, and an HGA trace coupled to the pad support and electrically coupled to the HGA pad. The flex connector comprises a substrate, comprising a first side and a second side, where the first side is opposite the second side. The flex connector also comprises a flex pad coupled to the first side of the substrate, a flex trace coupled to the second side of the substrate, and a via extending through the substrate from the first side to the second side. The via electrically couples the flex pad and the flex trace. The adhesive is between the HGA connector and the flex connector. Also, the adhesive adheres the HGA pad of the HGA connector in electrical contact with the flex pad of the flex connector. The preceding subject matter of this paragraph characterizes example 1 of the present disclosure.

The HGA pad of the HGA connector has a first total width. The flex pad of the flex connector has a second total width. The first total width is less than the second total width. The preceding subject matter of this paragraph characterizes example 2 of the present disclosure, wherein example 2 also includes the subject matter according to example 1, above.

The first total width is about one-sixth of the second total width. The preceding subject matter of this paragraph characterizes example 3 of the present disclosure, wherein example 3 also includes the subject matter according to example 2, above.

A first total length of the HGA pad is equal to a second total length of the flex pad. The preceding subject matter of this paragraph characterizes example 4 of the present disclosure, wherein example 4 also includes the subject matter according to any one of examples 1-3, above.

A first total length of the HGA pad is less than a second total length of the flex pad. The preceding subject matter of this paragraph characterizes example 5 of the present disclosure, wherein example 5 also includes the subject matter according to any one of examples 1-3, above.

The HGA connector further comprises a plurality of HGA pads coupled to the pad support and spaced apart in a first direction. The flex connector further comprises a plurality of flex pads coupled to the first side of the substrate and spaced apart in the first direction. A first total length of each HGA pad of the plurality of HGA pads is different. A second total length of each flex pad of the plurality of flex pads is the same. The preceding subject matter of this paragraph characterizes example 6 of the present disclosure, wherein example 6 also includes the subject matter according to any one of examples 1-5, above.

The substrate of the flex connector is interposed between the HGA pad of the HGA connector and the flex trace of the flex connector. The preceding subject matter of this paragraph characterizes example 7 of the present disclosure, wherein example 7 also includes the subject matter according to any one of examples 1-6, above.

The flex connector further comprises a land coupled to the second side. The land electrically couples the via and the flex trace. The land is wider than the via and the flex trace. The preceding subject matter of this paragraph characterizes example 8 of the present disclosure, wherein example 8 also includes the subject matter according to any one of examples 1-7, above.

The flex connector further comprises at least two vias extending through the substrate from the first side to the second side. The at least two vias electrically couple the flex pad and the flex trace. The land electrically couples the at least two vias and the flex trace. The preceding subject matter of this paragraph characterizes example 9 of the present disclosure, wherein example 9 also includes the subject matter according to example 8, above.

The pad support comprises a through-slot. The HGA pad spans across the through-slot. The preceding subject matter of this paragraph characterizes example 10 of the present disclosure, wherein example 10 also includes the subject matter according to any one of examples 1-9, above.

The pad support is made of a transparent material. The preceding subject matter of this paragraph characterizes example 11 of the present disclosure, wherein example 11 also includes the subject matter according to any one of examples 1-10, above.

The adhesive comprises an anisotropic conductive film. The preceding subject matter of this paragraph characterizes example 12 of the present disclosure, wherein example 12 also includes the subject matter according to any one of examples 1-11, above.

The anisotropic conductive film comprises electrically-conductive particles embedded within an electrically non-conductive material. The electrically-conductive particles of the anisotropic conductive film between the HGA pad and the flex pad establish electrical contact between the HGA pad and the flex pad. The preceding subject matter of this paragraph characterizes example 13 of the present disclosure, wherein example 13 also includes the subject matter according to example 12, above.

The connector assembly further comprises a secondary mechanical coupling configured to compress together the HGA connector and the flex connector. The preceding subject matter of this paragraph characterizes example 14 of the present disclosure, wherein example 14 also includes the subject matter according to any one of examples 1-13, above.

The HGA connector further comprises a suspension arm to which the pad support is coupled such that the pad support is interposed between the suspension arm and the HGA pad. The suspension arm comprises a first coupling element. The substrate of the flex connector further comprises a second coupling element. The secondary mechanical coupling comprises the first coupling element and the second coupling element. The first coupling element and the second coupling element are engageable via a fastener to compress together the HGA connector and the flex connector. The preceding subject matter of this paragraph characterizes example 15 of the present disclosure, wherein example 15 also includes the subject matter according to example 14, above.

The HGA connector further comprises a first cover applied onto the pad support and over the HGA trace. The flex connector further comprises a second cover applied onto the second side of the substrate and over the flex trace. The preceding subject matter of this paragraph characterizes example 16 of the present disclosure, wherein example 16 also includes the subject matter according to any one of examples 1-15, above.

Also disclosed herein is a hard disk drive that comprises a carriage, comprising an arm. The hard disk drive further comprises a head-gimbal assembly (HGA) coupled to the arm of the carriage. The hard disk drive additionally comprises a connector assembly comprising a head-gimbal assembly (HGA) tail connector, operably coupled with the HGA. The HGA tail connector comprises a pad support, an HGA pad coupled to the pad support, and an HGA trace coupled to the pad support and electrically coupled to the HGA pad. The connector assembly also comprises a flex connector, fixed onto the carriage. The flex connector comprises a substrate, comprising a first side and a second side, where the first side is opposite the second side. The flex connector also comprises a flex pad coupled to the first side of the substrate, a flex trace coupled to the second side of the substrate, and a via extending through the substrate from the first side to the second side. The via electrically couples the flex pad and the flex trace. The connector assembly further comprises an adhesive between the HGA connector and the flex connector. The adhesive adheres the HGA pad of the HGA connector in electrical contact with the flex pad of the flex connector. The preceding subject matter of this paragraph characterizes example 17 of the present disclosure.

The hard disk drive further comprises a plurality of connector assemblies. The preceding subject matter of this paragraph characterizes example 18 of the present disclosure, wherein example 18 also includes the subject matter according to example 17, above.

The hard disk drive also comprises an HGA tail electrically coupled with the HGA connector and fixed onto the arm of the carriage. The preceding subject matter of this paragraph characterizes example 19 of the present disclosure, wherein example 19 also includes the subject matter according to any one of examples 17 or 18, above.

Additionally disclosed is a method of making a hard disk drive. The method comprises coupling a head-gimbal assembly (HGA) to an arm of a carriage and fixing a flex connector onto the carriage. The flex connector comprises a substrate, comprising a first side and a second side, where the first side is opposite the second side. The flex connector also comprises a flex pad coupled to the first side of the substrate, a flex trace coupled to the second side of the substrate, and a via extending through the substrate from the first side to the second side. The via electrically couples the flex pad and the flex trace. The method additionally comprises locating an anisotropic conductive film between the flex connector and an HGA connector. The HGA connector comprises a pad support, an HGA pad coupled to the pad support, and an HGA trace coupled to the pad support and electrically coupled to the HGA pad. The method further comprises compressing the anisotropic conductive film between the flex connector and the HGA connector until electrically-conductive filaments of the anisotropic conductive film electrically couple together the flex pad of the flex connector and the HGA pad of the HGA connector. The method also comprises operably coupling the HGA connector with the HGA. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
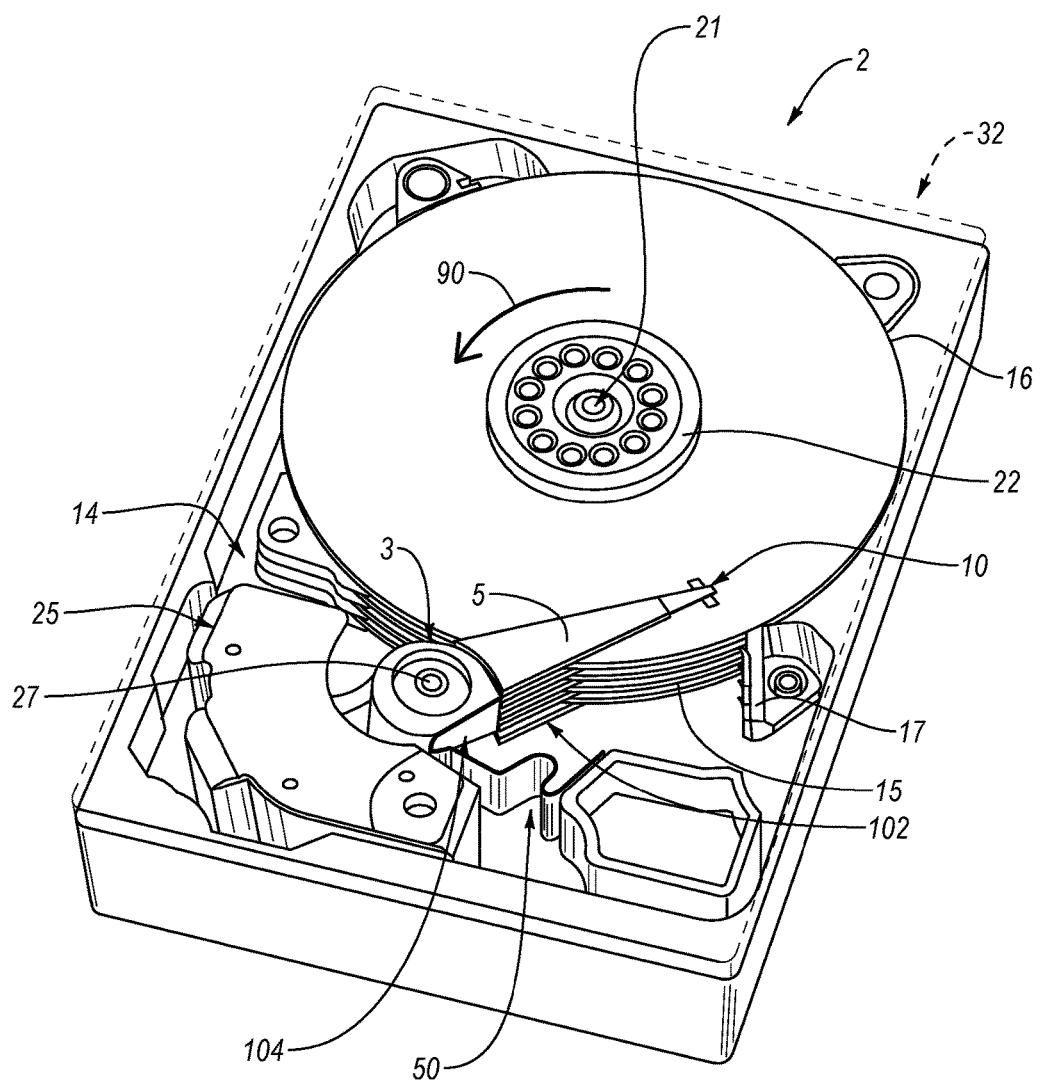
FIG. 1 is a perspective view of a hard disk drive having a connector assembly coupled to a carriage, according to one or more embodiments of the present disclosure.

Referring to FIG. 1, a hard disk drive (HDD) 2, according to one embodiment, is depicted. However, in other embodiments, the HDD 2 can be any of various magnetic storage devices without departing from the essence of the subject matter of the present disclosure. The HDD 2 includes a housing that hermetically seals or encloses an interior cavity 14 defined within the housing. The housing includes a base 30 and a cover 32 (shown in dashed lines so as not to obscure internal features of the HDD 2 within the interior cavity 14 of the housing). The cover is coupled to the base 30 to enclose the interior cavity 14 from the environment exterior to the housing. In some implementations, a seal or gasket is positioned between the base 30 and the cover to promote a seal between the base 30 and the cover.

The HDD 2 includes various features located within the interior cavity 14 of the housing. In some embodiments, the HDD 2 includes a carriage 3, disks 15, a spindle motor 21, and a voice coil magnetic (VCM) actuator 25 within the interior cavity 14. The carriage 3 includes a plurality of arms 5 and at least one head-gimbal assembly (HGA) 10 coupled to the distal tip of each arm of the plurality of arms 5. Each HGA 10 includes at least one read-write head and at least one gimbal. The gimbal movably couples the read-write head to a respective arm 5. Although the HDD 2 is shown to have five arms 5, one HGA 10 per side of each arm facing a disk 15 (e.g., bottom and top arms 5 have one HGA 10 and middle arms 5 have two HGAs 10), four disks 15, one spindle motor 21, and one VCM actuator 25, any number of arms 5, HGAs 10, disks 15, spindle motors 21, and VCM actuators 25 may be employed.

The spindle motor 21 is coupled to the base 30. Generally, the spindle motor 21 includes a stationary portion non-movably fixed relative to the base 30 and a spindle that is rotatable relative to the stationary portion and the base 30. Accordingly, the spindle of the spindle motor 21 can be considered to be part of or integral with the spindle motor. Generally, the spindle motor 21 is operable to rotate the spindle relative to the base 30. The disks 15, or platters, are co-rotatably fixed to the spindle of the spindle motor 21 via respective hubs 22, which are co-rotatably secured to respective disks 15 and the spindle. As the spindle of the spindle motor 21 rotates, the disks 15 correspondingly rotate. In this manner, the spindle of the spindle motor 21 defines a rotational axis of each disk 15. The spindle motor 21 can be operatively controlled to rotate the disks 15, in a rotational direction 90, a controlled amount at a controlled rate.

Each of the disks 15 may be any of various types of magnetic recording media. Generally, in one embodiment, each disk 15 includes a substrate and a magnetic material applied directly or indirectly onto the substrate. For example, the magnetic material of the disks 15 may be conventional granular magnetic recording disks or wafers that have magnetic layer bits with multiple magnetic grains on each bit. In granular magnetic media, all of the bits are co-planar and the surface 16 of the disk is substantially smooth and continuous. In one embodiment, each bit has a magnetic dipole moment that can either have an in-plane (longitudinal) orientation or an out-of-plane (perpendicular) orientation.

As the disks 15 rotate in a read-write mode, the VCM actuator 25 electromagnetically engages voice coils of respective arms 5 to rotate the arms 5, and the HGAs 10, which are coupled to the arms 5, relative to the disks 15 in a rotational direction along a plane parallel to read-write surfaces 16 of the disks 15. The arms 5 can be rotated to position the read-write head of the HGAs 10 over a specified radial area of the read-write surface 16 of a respective disk 15 for read and/or write operations. The VCM actuator 25 is fixed to the base 30 in engagement with the voice coils of the arms 5, which are rotatably coupled to the base 30 via a spindle 27 extending through the base 60 of the carriage 3. Generally, the spindle 27 defines a rotational axis about which the arms 5 rotate when actuated by the VCM actuator 25.

The arms 5 are non-movably fixed to and extend away from the base 60 in a spaced-apart manner relative to each other. In some implementations, the arms 5 are spaced an equi-distance apart from each other and extend parallel relative to each other. A respective one of the disks 15 is positioned between adjacent arms 5. In an idle mode (e.g., when read-write operations are not being performed), the VCM actuator 25 is actuated to rotate the arms 5, in a radially outward direction relative to the disks 15, such that the HGAs 10 are parked or unloaded onto a ramp support 17 secured to the base 30.

Although not shown, the HDD 2 further includes a device control module, including software, firmware, and/or hardware, used to control operation of the various components of the HDD 2. The device control module may include a printed circuit board on or in which the hardware is mounted. In some embodiments, the device control module can be electrically coupled to the VCM actuator 25 and the read-write heads of the HGAs 10, via one or more electrical communication signal transmission lines, to control operation of the HGAs 10. The electrical communication signal transmission lines facilitate the transmission of power, operational commands, and data between the device control module and the VCM actuator 25 and the read-write heads of the HGAs 10. In some implementations, the electrical communication signal transmission lines are integrated into a flexible printed circuit board (FPCB) 50. The FPCB 50 is coupled to a connector assembly 100 (see, e.g., FIG. 2), which is coupled to the carriage 3. More specifically, the connector assembly 100 includes a flex connector 104, which is fixed onto the carriage 3. The FPCB 50 is flexible to allow the flex connector 104 to remain non-movably fixed onto the carriage 3 rotates relative to the FPCB 50. In other words, as the carriage 3 rotates, the FPCB 50 flexes to accommodate the rotation of the carriage 3.

The transmission of power, commands, and data between the device control module and a respective HGA 10 is facilitated by an HGA connector 102 of the connector assembly 100 and an HGA tail 140. The HGA connector 102 is physically and electrically coupled with the flex connector 104 as will be explained in more detail below. The HGA tail 140 is electrically coupled with the HGA connector 102 and the HGA 10. Electrical signals are transmitted between the device control module and the HGA 10 via the electrical connections between the flex connector 104, the HGA connector 102, and the HGA tail 140. To maintain operational control of the HGAs 10, the electrical connections of the connector assembly 100 (i.e., between at least the flex connector 104 and the HGA connector 102) should be strong and reliable.

Figure 2:
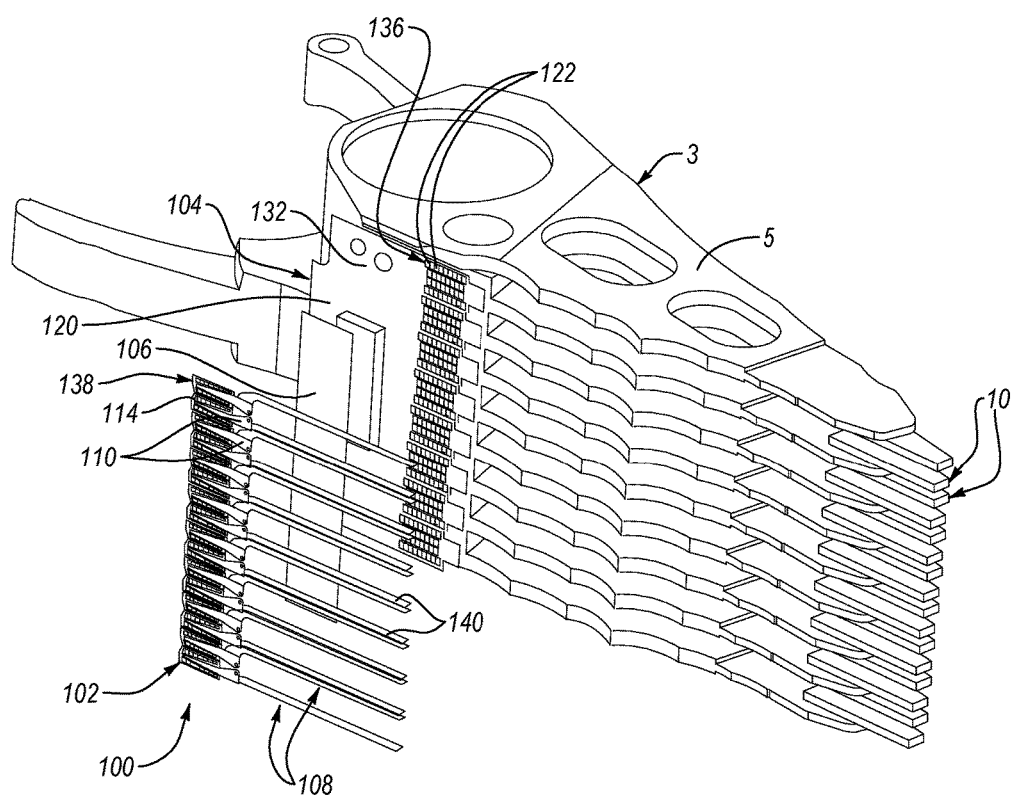
FIG. 2 is an exploded perspective view of a carriage and a connector assembly of a hard disk drive, according to one or more embodiments of the present disclosure.
Figure 3:
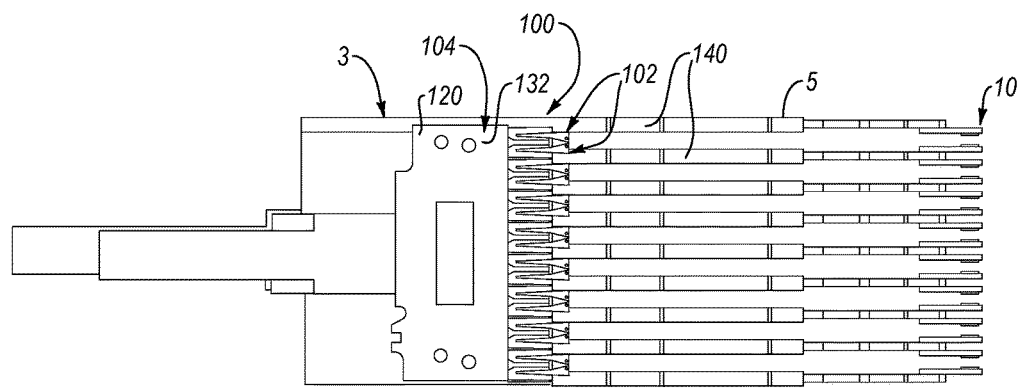
FIG. 3 is a side elevation view of the carriage and the connector assembly of FIG. 2, according to one or more embodiments of the present disclosure.
Figure 4:
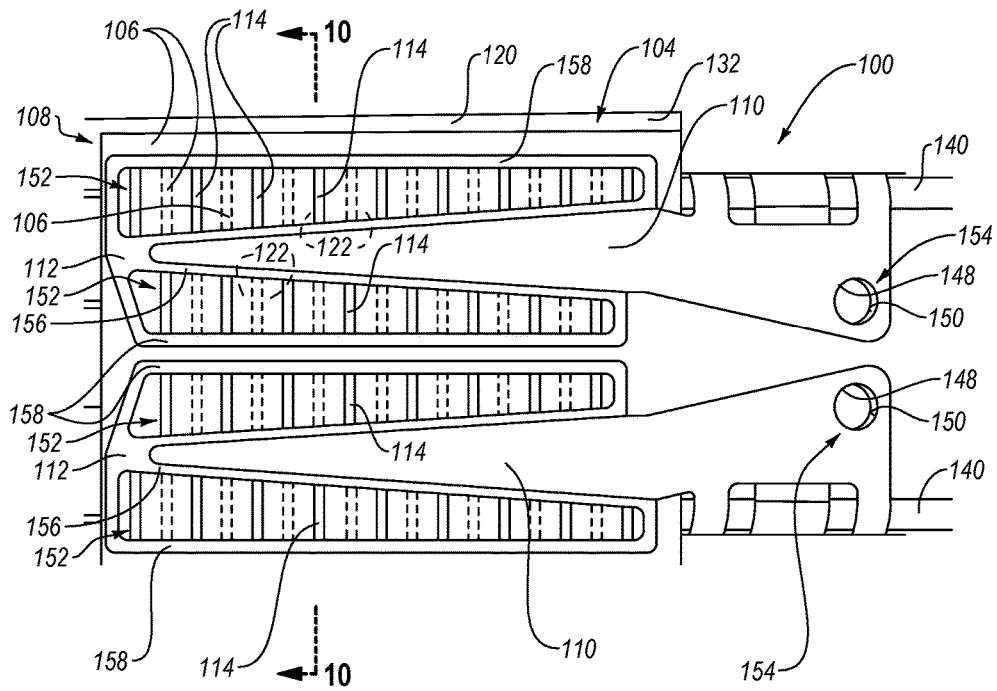
FIG. 4 is an enlarged side elevation view of a portion of the carriage and the connector assembly of FIG. 3, according to one or more embodiments of the present disclosure.

Referring to FIGS. 2-4, the connector assembly 100 includes the HGA connector 102, the flex connector 104, and an adhesive 106 interposed between and coupling together the HGA connector 102 and the flex connector 104. Generally, the adhesive 106 adheres the HGA connector 102 in electrical contact with the flex connector 104. Accordingly, not only does the adhesive 106 at least partially physically couple together the HGA connector 102 and the flex connector 104 by adhering the HGA connector 102 to the flex connector 104, but the adhesive 106 also facilitates electrical connectivity between the HGA connector 102 and the flex connector 104.

The HGA connector 102 includes at least one HGA connector unit 108. In the illustrated embodiments, the HGA connector 102 includes multiple HGA connector units 108 each electrically coupled with a respective one of multiple HGA tails 140 and multiple HGAs 10. Each HGA connector unit 108 includes a suspension arm 110, a pad support 112, HGA pads 114, and HGA traces 116. The pad support 112 is coupled to the suspension arm 110.

In one implementation, the pad support 112 is coupled directly to the suspension arm 110 using any of various coupling techniques, such as adhesion, bonding, fastening, and the like. The suspension arm 110 is made of any of various materials, such as a metal, metal alloy, or non-metal. The pad support 112 is made of an electrically non-conductive material, such as a polymer (e.g., hardened plastic), glass epoxy, ceramic material, composite material, and the like. The pad support 112 has a first side 144 and a second side 146, opposite the first side 144. Moreover, the pad support 112 includes a central region 156 and two peripheral regions 158 each extending about one side of the central region 156. The suspension arm 110 is coupled to the second side 146 of the pad support 112. More specifically, in some implementations, the suspension arm 110 is mounted onto the second side 146 of the central region 156 of the pad support 112. As shown, in certain implementations, both the suspension arm 110 and the central region 156 of the pad support 112 are tapered in the same direction (i.e., a tapering direction 160), such that each of the suspension arm 110 and the central region 156 of the pad support 112 has a generally triangular shape.

The suspension arm 110 also includes a first coupling element 148, which can be an aperture. Further, the suspension arm 110 includes a mechanical connection that is configured to support and retain the HGA tail 140.

Referring to FIGS. 4 and 7-10, in some embodiments, the pad support 112 includes a through-slot 152 between the central region 156 and each of the peripheral regions 158. Accordingly, the through-slots 152 define respective spaces that separate the central region 156 from the peripheral regions 158. As an example, the through-slots 152 taper in a direction opposite the tapering direction 160. Accordingly, the width of the through-slots 152 increases in the tapering direction 160. As will be explained in more detail below, the through-slots 152 facilitate visibility of the HGA pads 114 through the pad support 112, which promotes proper placement or alignment of the HGA connector 102 with the flex connector 104.

Figure 11:
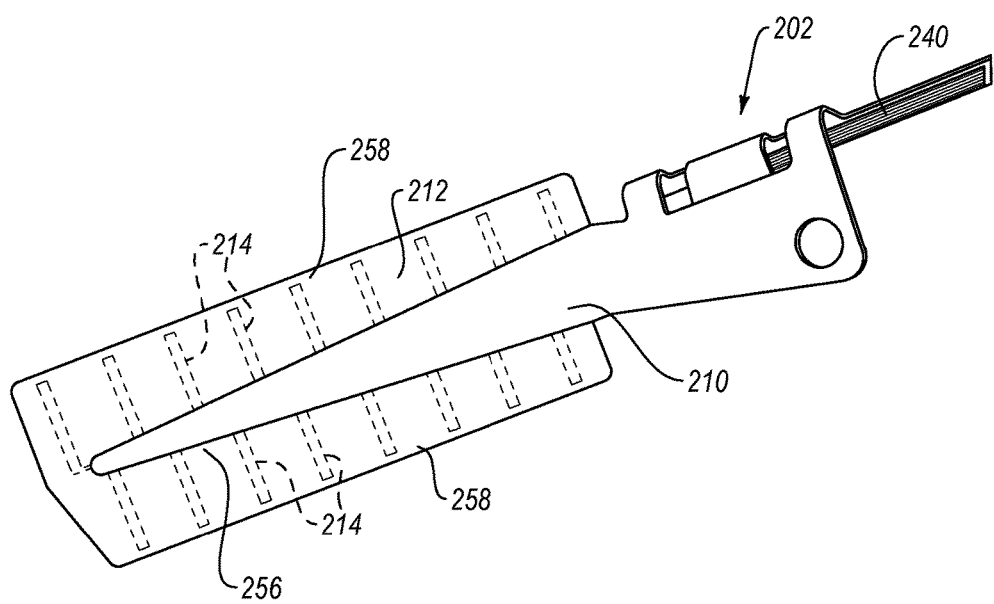
FIG. 11 is a side elevation view of another HGA connector of a connector assembly, according to one or more embodiments of the present disclosure.

Referring now to FIG. 11, in other embodiments, a pad support 212 of an HGA connector 202 does not include through-slots between a central region 256 and peripheral regions 258. Rather, the pad support 212 includes solid material between the central region 256 and the peripheral regions 258. To facilitate visibility of the HGA pads 114, the pad support 212 is made of an at least partially transparent material that allows a user to see the HGA pads 114 through the pad support 212.

The HGA pads 114 of each HGA connector unit 108 are coupled directly to (e.g., adjoin) the pad support 112 using any of various coupling techniques, such as adhesion, bonding, fastening, printing, deposition, and the like. However, in contrast to the suspension arm 110, the HGA pads 114 are coupled to the first side 144 of the pad support 112. More specifically, the HGA pads 114 are mounted (e.g., applied) onto the first side 144 of the pad support 112. Accordingly, the pad support 112 is interposed between the suspension arm 110 and the HGA pads 114 to electrically isolate the suspension arm 110 from the HGA pads 114. Each HGA pad 114 extends from the central region 156 of the pad support 112 to a respective one of the peripheral regions 158 of the pad support 112. In the embodiment shown in FIGS. 4 and 7-10, each HGA pad 114 spans the width of a respective one of the through-slots 152 from the central region 156 to a respective one of the peripheral regions 158. In contrast, in the embodiment shown in FIG. 11, because the pad support 212 does not include through-slots, an entirety of each HGA pad 214 extends along the pad support 212 from the central region 256 to a respective one of the peripheral regions 258. The HGA pads 114 are made of an electrically conductive material, such as a metal (e.g., copper or silver). The HGA pads 114 on a given peripheral region 158 (e.g., side) of the pad support 112 are collectively defined as a set of HGA pads 138. Accordingly, each HGA connector unit 108 includes two sets of HGA pads 138.

Figure 7:
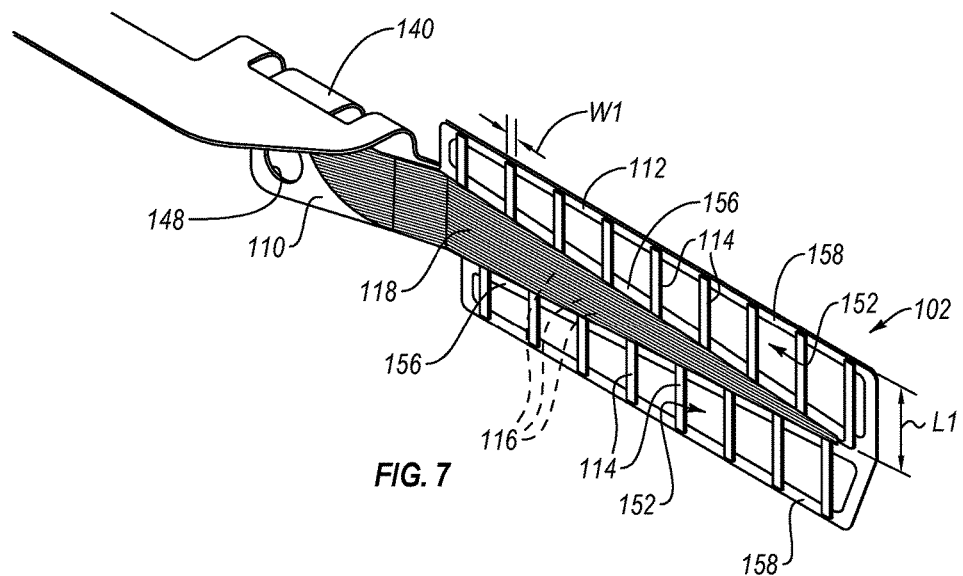
FIG. 7 is a perspective view of one side of an HGA connector of the connector assembly of FIG. 2, according to one or more embodiments of the present disclosure.
Figure 8:
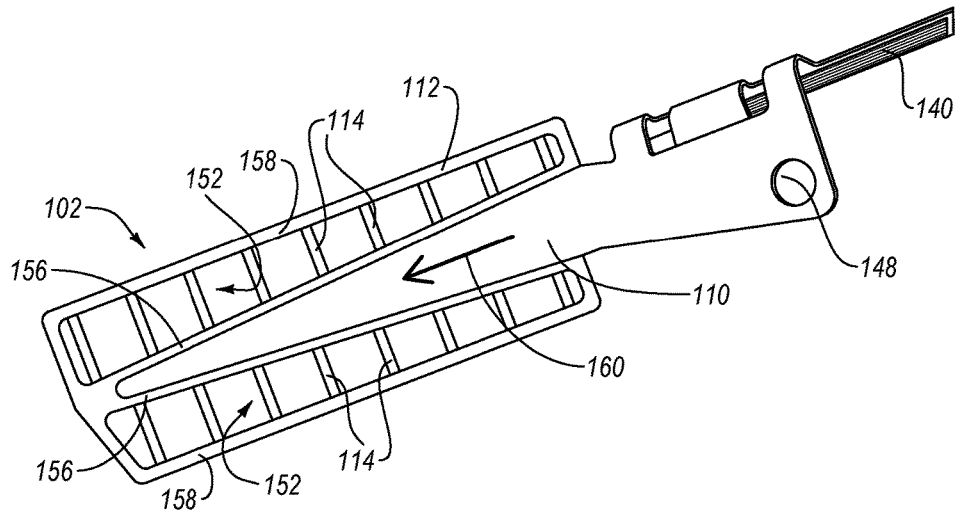
FIG. 8 is a perspective view of an opposite side of the HGA connector of the connector assembly of FIG. 2, according to one or more embodiments of the present disclosure.

Referring to FIG. 7, each HGA pad 114 has an entire length L1 and an entire width W1. In some embodiments, each HGA pad 114 is elongate in the lengthwise direction such that the length L1 of each HGA pad 114 is greater than the width W1. According to one implementation, for example, the width W1 of each HGA pad 114 is about 50 μm and the length of each HGA pad 114 is at least 300 μm. The width W1 of each HGA pad 114 of the HGA connector unit 108 is the same. In some embodiments, the length L1 of each HGA pad 114 of the HGA connector unit 108 is the same. However, in certain embodiments, as shown, the length L1 of each HGA pad 114 of a given set of HGA pads 138 is different based on the location of the HGA pad 114 on the pad support 112. For example, the further along in the tapering direction 160, the longer the length L1 of the HGA pad 114. In other words, the length L1 of a given HGA pad 114 of a set of HGA pads 138 is shorter than the length L1 of the HGA pads 114 of the set of HGA pads 138 positioned in the tapering direction 160 away from the given HGA pad 114. According to some implementations, the HGA pads 114 of a given set of HGA pads 138 are positioned an equal distance away from each other in the tapering direction 160. However, along the tapering direction 160, the HGA pads 114 of one set of HGA pads 138 of a given HGA connector unit 108 are staggered relative to the HGA pads 114 of the other set of HGA pads 138 of the given HGA connector unit 108.

The HGA traces 116 of each HGA connector unit 108 are also coupled to the pad support 112. Like the HGA pads 114, the HGA traces 116 are coupled to the first side 144 of the pad support 112. More specifically, in some implementations, the HGA traces 116 are mounted (e.g., applied) onto the first side 144 of the central region 156 of the pad support 112 using any of various coupling techniques, such as adhesion, bonding, fastening, printing, deposition, and the like. The HGA traces 116 are electrically isolated from each other via spaces between the HGA traces 116. Moreover, each HGA trace 116 is electrically connected with a respective one of the HGA pads 114 of the HGA connector unit 108. The HGA traces 116 are made of an electrically conductive material. In some embodiments, the electrically conductive material of the HGA traces 116 is the same as that of the HGA pads 114. The HGA tail 140 includes a plurality of electrical wires (not shown) each electrically isolated from each other and each electrically connected to a respective one of the HGA traces 116.

In some embodiments, the HGA connector 102 further includes a first cover 118 that is applied onto the pad support 112 over the HGA traces 116. Accordingly, the HGA traces 116 are positioned between the first cover 118 and the pad support 112. The first cover 118 is made of an electrically non-conductive material, such as a plastic. Therefore, the first cover 118 and the pad support 112 electrically isolate the HGA traces 116 from other electrically conductive components, such as the adhesive 106. Additionally, the first cover 118 physically protects the HGA traces 116.

Referring now to FIGS. 2-6, 9, and 10, according to some embodiments, the flex connector 104 includes a substrate 120, flex pads 122, vias 124, lands 126, and flex traces 128. The substrate 120 has a first side 132 and a second side 134, opposite the first side 132. Furthermore, the substrate 120 is made from an electrically non-conductive or electrically-insulating material, such as plastic, glass epoxy, or other materials. Generally, the substrate 120 has a sheet-like shape. More specifically, the substrate 120 has a width and a length that are much larger than a thickness. In some implementations, the substrate 120 has multiple layers stacked together. For example, in one implementation, the substrate 120 includes an electrically conductive layer sandwiched between two electrically non-conductive layers.

The flex pads 122 are coupled to the first side 132 of the substrate 120 using any of various coupling techniques, such as adhesion, bonding, fastening, printing, deposition, and the like. More specifically, in some embodiments, the flex pads 122 are coupled directly to (e.g., adjoin) the first side 132 of the substrate 120. The flex pads 122 are made of an electrically conductive material, such as a metal (e.g., copper or silver). Moreover, the flex pads 122 are arranged into multiple sets of flex pads 136. Each set of flex pads 136 includes multiple flex pads 122 that are aligned in the tapering direction 160. Accordingly, the sets of flex pads 136 are parallel to each other on the first side 132 of the substrate 120.

Figure 5:
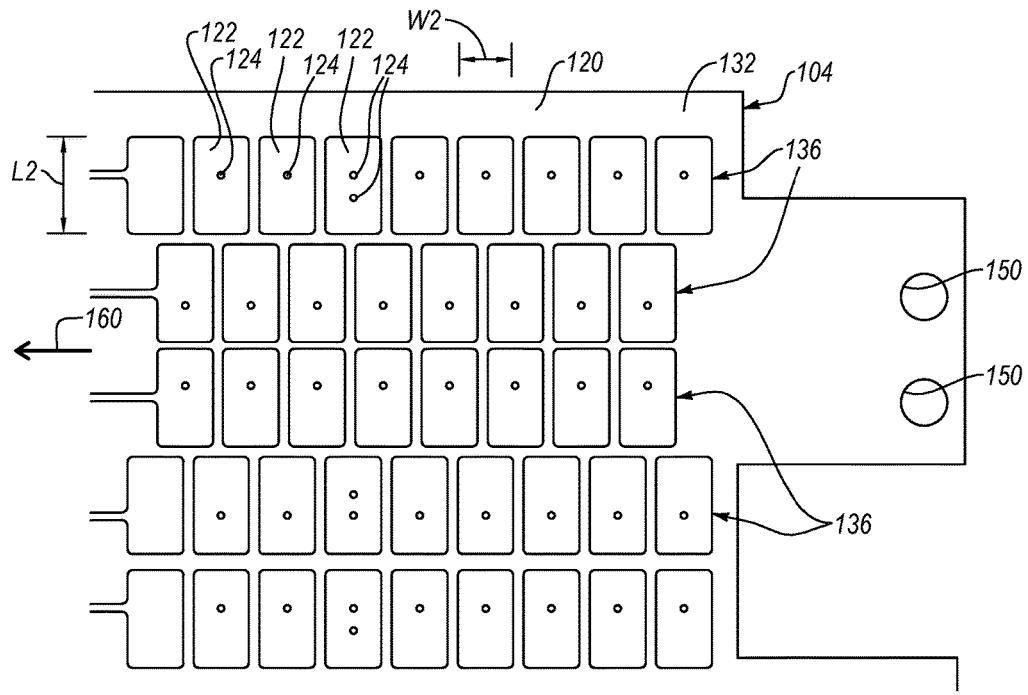
FIG. 5 is a side elevation view of one side of a flex connector of the connector assembly of FIG. 2, according to one or more embodiments of the present disclosure.

Referring to FIG. 5, each flex pad 122 has an entire length L2 and an entire width W2. In some embodiments, each flex pad 122 is elongate in the lengthwise direction such that the length L2 of each flex pad 122 is greater than the width W2. According to one implementation, for example, the width W2 of each flex pad 122 is about 300 μm and the length of each flex pad 122 is at least 300 μm. The width W2 of each flex pad 122 is the same in some implementations. In yet some embodiments, the length L2 of each flex pad 122 is the same. According to some implementations, the flex pads 122 of a given set of flex pads 136 are positioned an equal distance away from each other in the tapering direction 160. In one example, the flex pads 122 of a given set of flex pads 136 are a distance of about 50 μm apart from each other. As will be described in more detail below, the flex pads 122 of one set of flex pads 136 are configured to electrically contact the respective HGA pads 114 of a corresponding set of HGA pads 138. Therefore, the sets of flex pads 136 can be paired together such that each pair of sets of flex pads 136 establishes an electrical connection with the two sets of HGA pads 138 of a respective one of the HGA connector units 108. Accordingly, along the tapering direction 160, the flex pads 122 of one set of flex pads 136 of a given pair are staggered relative to the flex pads 122 of the other set of flex pads 136 of the given pair. Generally, the spacing and size of the flex pads 122 of a given set of flex pads 136 and the spacing and size of the HGA pads 114 of a corresponding set of HGA pads 138 is coordinated to help ensure proper electrical connections are established between respective flex pads 122 and HGA pads 114. More specifically, because the width W2 of the flex pads 122 is several orders of magnitude larger than (e.g., six times) the width W1 of the HGA pads 138, in some implementations, proper electrical connections of the HGA pads 138 on respective flex pads 122 is made easier as the tolerance for misalignment between the HGA pads 138 and flex pads 122 is increased.

Figure 9:
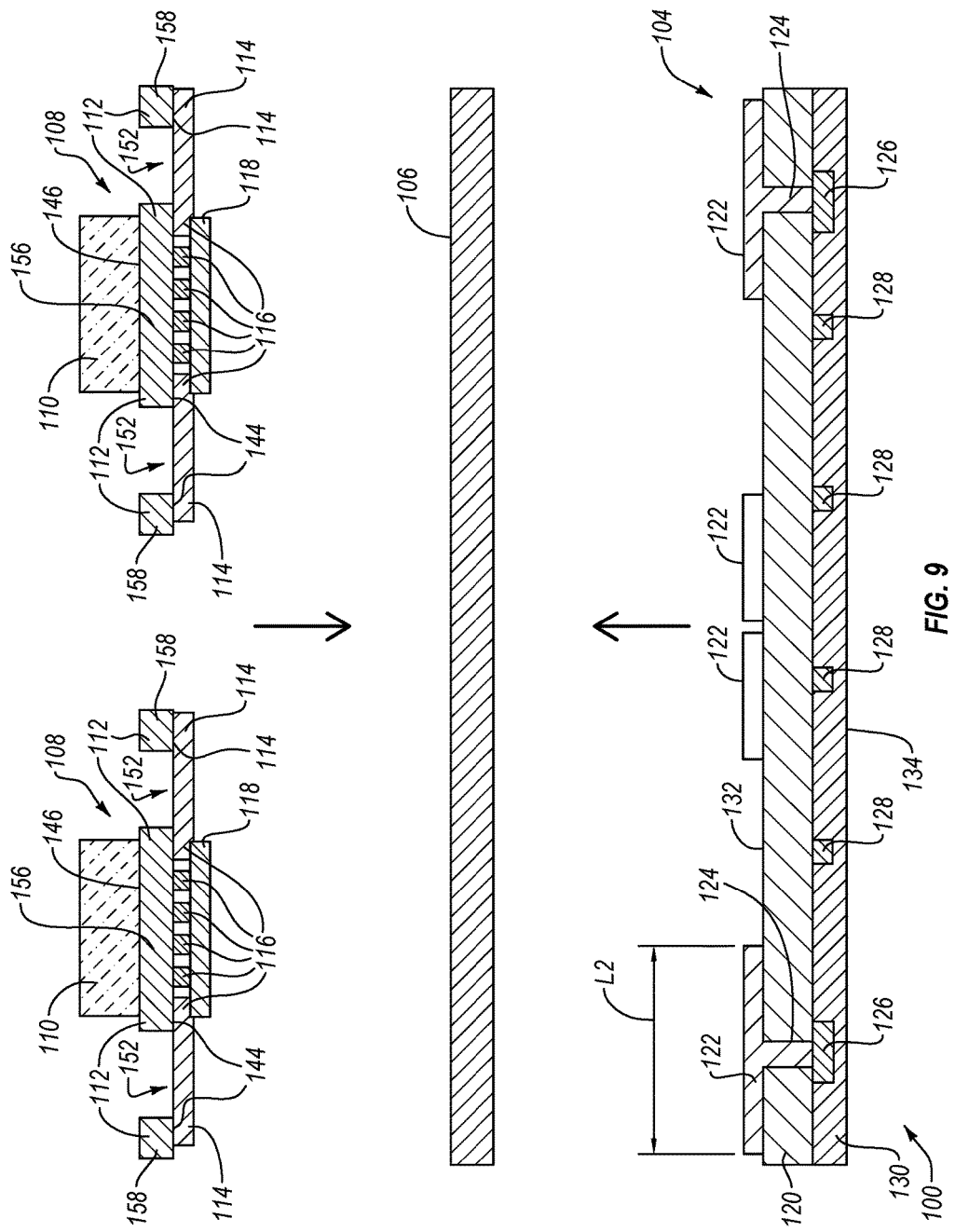
FIG. 9 is a cross-sectional exploded top plan view of the connector assembly of FIG. 4, taken along the line 10-10 of FIG. 4, according to one or more embodiments of the present disclosure.
Figure 10:
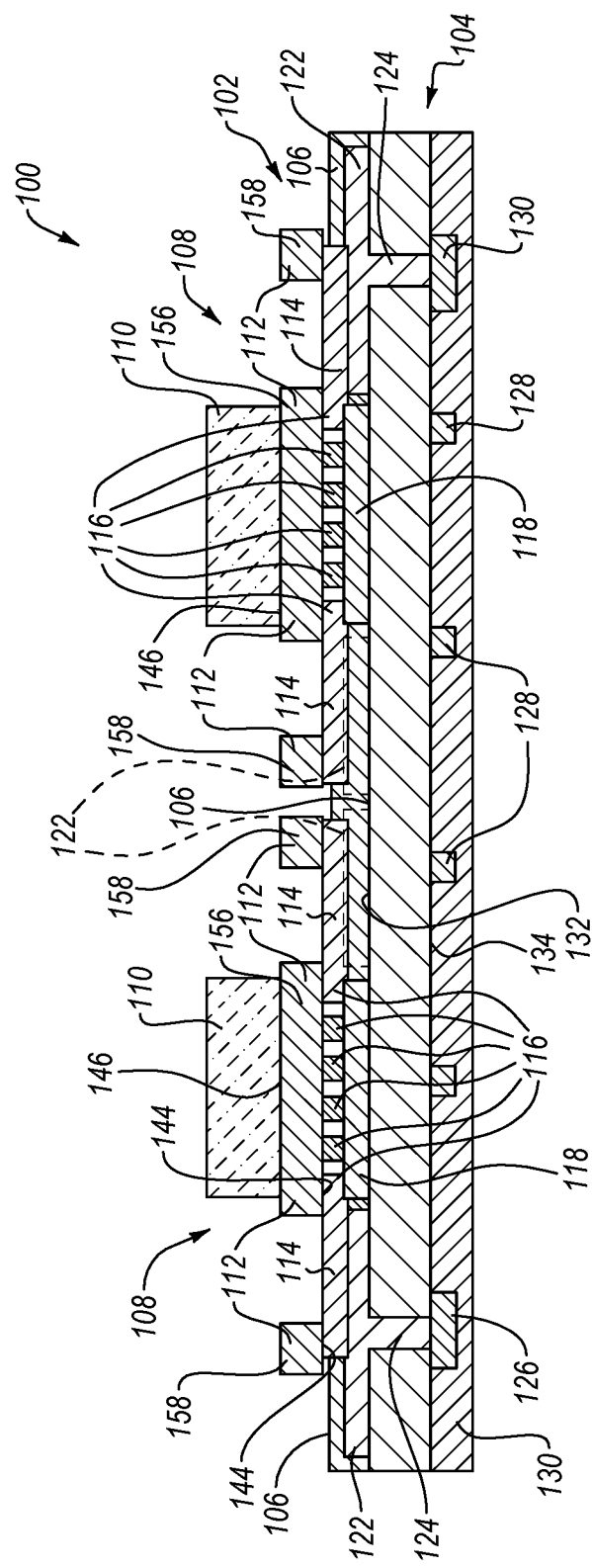
FIG. 10 is a cross-sectional top plan view of the connector assembly of FIG. 4, taken along the line 10-10 of FIG. 4, according to one or more embodiments of the present disclosure.

The flex connector 104 includes at least one via 124 for each flex pad 122 of the sets of flex pads 136. Each via 124 is formed in a through-hole in the substrate 120 that is aligned with the flex pad 136 associated with the via 124. In other words, the substrate 120 includes multiple through-holes each under a respective one of the flex pads 122. Referring to FIGS. 9 and 10, each via 124 is a length (e.g., hollow cylinder) of electrically-conductive material formed in one of the through-holes in the substrate 120. Each via 124 extends entirely through the corresponding through-hole, from the first side 132 to the second side 134 of the substrate 120, to electrically contact, and thus be electrically coupled with, the flex pad 122 over the via 124.

Figure 6:
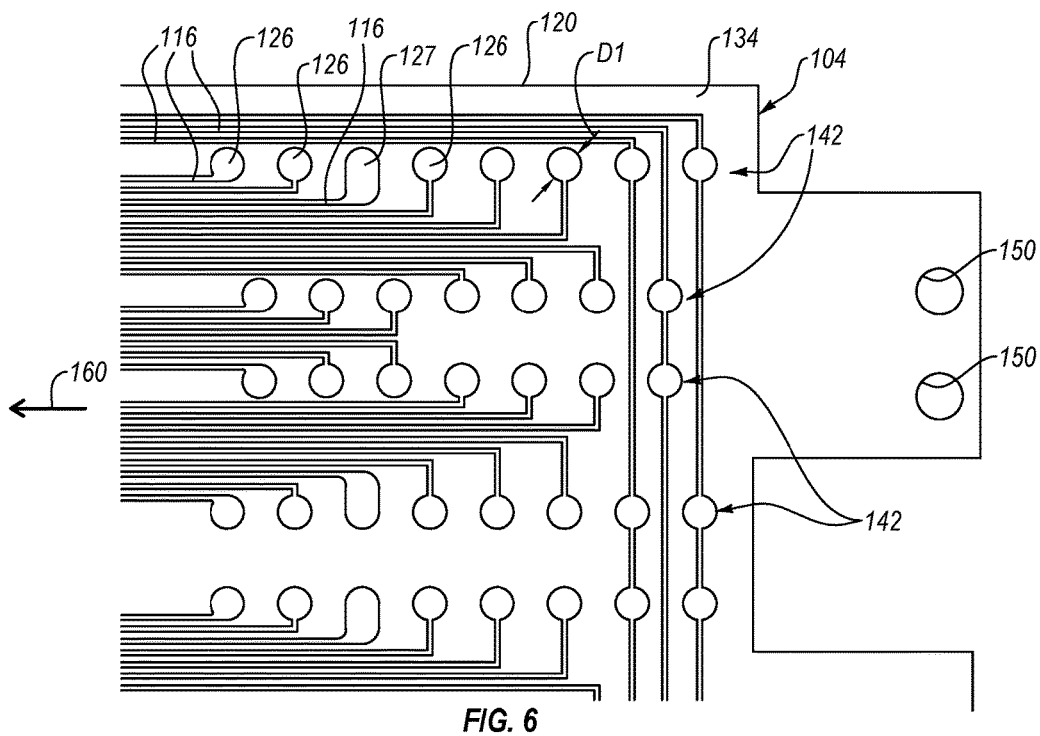
FIG. 6 is a side elevation view of an opposite side of the flex connector of the connector assembly of FIG. 2, according to one or more embodiments of the present disclosure.

The lands 126 are coupled to the second side 134 of the substrate 120 using any of various coupling techniques, such as adhesion, bonding, fastening, printing, deposition, and the like. More specifically, in some embodiments, the lands 126 are coupled directly to (e.g., adjoin) the second side 134 of the substrate 120. The lands 126 are made of an electrically conductive material, such as a metal (e.g., copper or silver). Each land 126 is electrically coupled with at least one via 124. Moreover, each land 126 has a cross-sectional area (e.g., width) that is larger than that of each via 124. According to one example, each land 126 has a diameter of about 175 µm and each via 124 has a maximum diameter of about 50 µm. Generally, the flex connector 104 is configured to have one via 124 and one land 126 for each flex pad 122. However, as shown in FIGS. 5 and 6, in some implementations, such as when the flex pad 122 is used to transmit large currents (e.g., an LD power line), one flex pad 122 may have two or more vias 124. In such implementations, the land 126 can be larger than other lands 126 to facilitate electrical coupling with both of the two or more vias 124.

In the above manner, the vias 124 provide an electrical conduit through the substrate 120 from the flex pads 122 on the first side 132 of the substrate to the lands 126 on the second side 134 of the substrate 120. Each of the lands 126 is electrically coupled with a respective one or more of multiple flex traces 128 coupled to the second side 134 of the substrate 120. In some implementations, the flex traces 128 are mounted (e.g., applied) onto the second side 134 of the substrate 120 using any of various coupling techniques, such as adhesion, bonding, fastening, printing, deposition, and the like. Accordingly, because the flex traces 128 are on an opposite side of the substrate 120 as the flex pads 122, and separated from the HGA traces 116 by the substrate 120, a reduction in the signal noise and interference between the flex traces 128 and the HGA traces 116 is promoted. The flex traces 128 are electrically isolated from each other via spaces between the flex traces 128. Moreover, each flex trace 128 is electrically connected with a respective one or more of the flex pads 122 via respective one or more lands 126 and respective one or more vias 124. The flex traces 128 are made of an electrically conductive material. In some embodiments, the electrically conductive material of the flex traces 128 is the same as that of the flex pads 122.

In some embodiments, the flex connector 104 further includes a second cover 130 that is applied onto the second side 134 of the substrate 120 over the flex traces 128. Accordingly, the flex traces 128 are positioned between the second cover 130 and the substrate 120. The second cover 130 is made of an electrically non-conductive material, such as a plastic. Therefore, the second cover 130 and the substrate 120 electrically isolate the flex traces 128 from other electrically conductive components, such as the adhesive 106. Additionally, the second cover 130 physically protects the flex traces 128.

The substrate 120 of the flex connector 104 also includes multiple second coupling elements 150. In some implementations, each second coupling element 150 is an aperture. Each second coupling element 150 is coupleable with the first coupling element 148 of the suspension arm 110 of a respective HGA connector 102. In the illustrated implementation, a fastener can be inserted through the first coupling element 148 and the second coupling element 150 to provide a secondary mechanical coupling between the HGA connector 102 and the flex connector 104 in addition to the primary mechanical coupling provided by the adhesive 106. Additionally, the secondary mechanical coupling helps to promote proper alignment and relative positioning of the flex connector 104 and an HGA connector 102.

Referring to FIGS. 9 and 10, the adhesive 106 is interposed between and binds together the HGA connector 102 and the flex connector 104 to form the connector assembly 100. The adhesive 106 includes a relatively thin layer of an electrically non-conductive material or matrix (e.g., glue, cement, paste, and the like) with adhesion properties sufficient to bond together the HGA connector 102 and the flex connector 104 and resists separation of the HGA connector 102 and flex connector 104 during normal operation of the HDD 2. The electrically non-conductive material of the adhesive 106 can be a non-reactive adhesive or a reactive adhesive. The adhesion properties of non-reactive adhesives are activated without a chemical reaction. The non-reactive adhesive can be, for example, a pressure-sensitive adhesive (adhesion properties activated via the application of pressure), a contact adhesive (adhesion properties activated when cold adhesive is allowed to dry), a hot adhesive (adhesion properties activated when hot adhesive is allowed to dry), and the like. In contrast, the adhesion properties of reactive adhesives require a chemical reaction to be activated. The reactive adhesive can be, for example, a multi-part adhesive (adhesion properties activated when two parts and mixed and dried, a single-part adhesive (adhesion properties activated under external energy source, such as radiation, heat, and moisture), and the like.

Accordingly, to bond together the HGA connector 102 and the flex connector 104, the adhesion properties of the adhesive 106 are activated when the adhesive 106 is interposed between and in contact with both the HGA connector 102 and the flex connector 104. In one embodiment, the adhesion properties of the adhesive 106 are activated when the flex pads 122 of one set of flex pads 136 are directly physically contacting the respective HGA pads 114 of a corresponding set of HGA pads 138. The direct physical contact between the flex pads 122 and the HGA pads 114 establishes the electrical contact (i.e., electrical connection) between the flex pads 122 and the HGA pads 114. In other words, in this embodiment, no portion of the adhesive 106 is interposed between the flex pads 122 and the HGA pads 114. However, the adhesive 106 adheres the flex pads 122 and the HGA pads 114 in electrical contact with each other by bonding together (e.g., physically preventing separation of) the HGA connector 102 and the flex connector 104, to provide a first mechanical coupling, with the flex pads 122 and the HGA pads 114 in direct physical contact with each other. According to one implementation of this embodiment, the direct physical contact between the flex pads 122 and the HGA pads 114 is enhanced by the ultrasonic or diffusion coupling of the flex pads 122 and the HGA pads 114.

According to another embodiment, the adhesive 106 comprises an anisotropic conductive film. Generally, the anisotropic conductive film establishes not only a first mechanical coupling between the HGA connector 102 and the flex connector 104, but also establishes the electrical contact between the flex pads 122 and the HGA pads 114. The anisotropic conductive film can be any of various anisotropic films. For example, in one implementation, the anisotropic conductive film includes an electrically non-conductive adhesive material or matrix and electrically conductive particles or filaments embedded or contained within the electrically non-conductive adhesive material. The electrically conductive particles become trapped (e.g., sandwiched) between the flex pads 122 and the HGA pads 114 as the HGA connector 102 and the flex connector 104 are brought together to compress the adhesive 106 between the flex pads 122 and the HGA pads 114. In other words, the electrically conductive particles occupy the space between and establish direct physical contact with the flex pads 122 and the HGA pads 114. With the electrically conductive particles trapped between the flex pads 122 and the HGA pads 114, the adhesion properties of the adhesive 106 are activated. In one implementation, the electrically non-conductive adhesive material is a thermosetting resin that is cured to activate the adhesion properties of the adhesive 106. Even though the flex pads 122 and the HGA pads 114 are not in direct physical contact with each other, the electrically conductive particles of the adhesive, which are in direct physical contact with the flex pads 122 and the HGA pads 114, establish electrical contact between the flex pads 122 and the HGA pads 114. The electrically-conductive particles in the anisotropic conductive film not between the flex pads 122 and the HGA pads 114 are insulated from electrical contact with other components of the connector assembly 100 (e.g., other flex pads and HGA pads) by the electrically non-conductive adhesive material.

Figure 12:
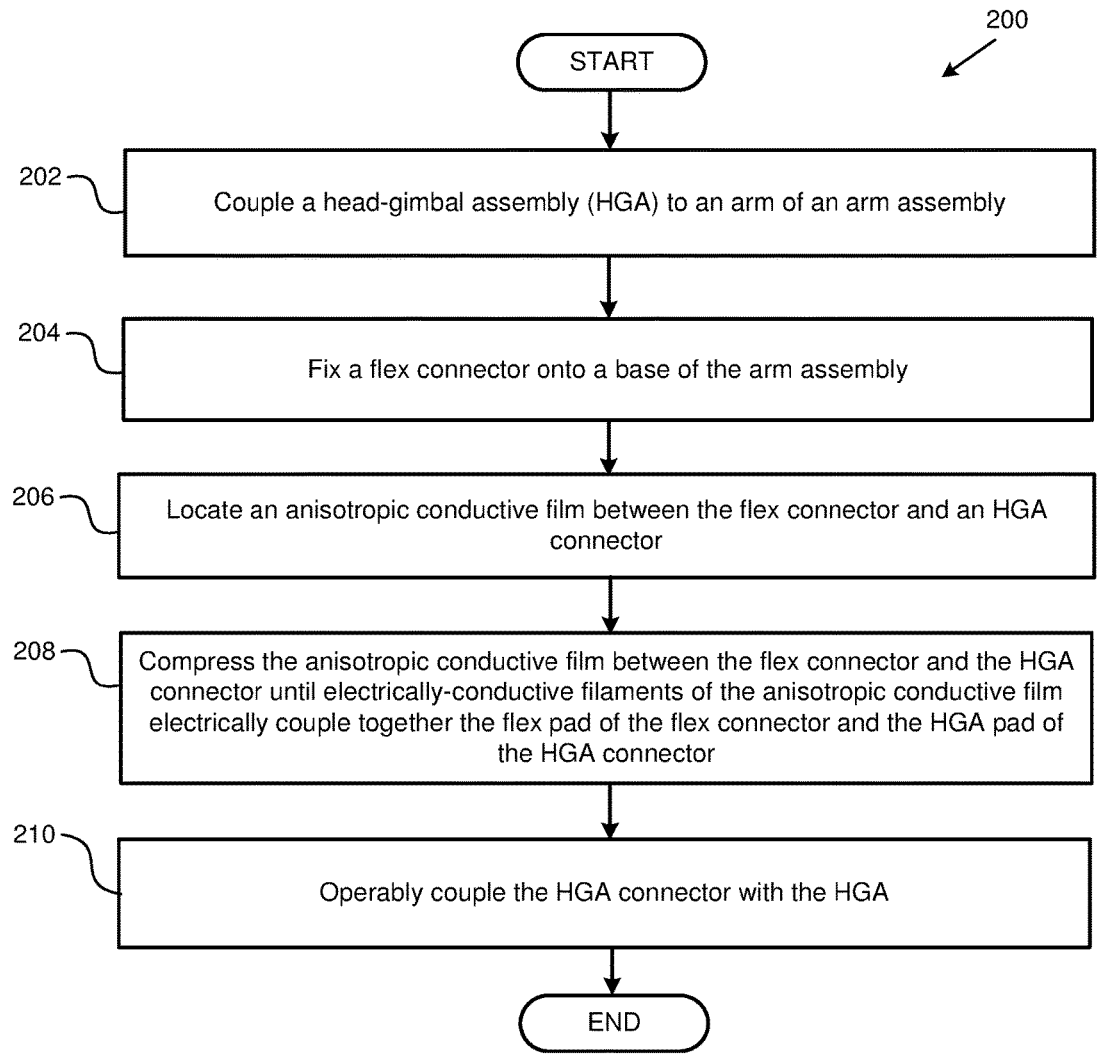
FIG. 12 is a schematic flow chart of a method of making a hard disk drive, according to one or more embodiments of the present disclosure.

Referring to FIG. 12, one embodiment of a method 200 of making a hard disk drive, such as HDD 2, is illustrated. The method 200 includes coupling a head-gimbal assembly (HGA) to an arm of a carriage at 202. The method 200 also includes fixing a flex connector onto the carriage at 204. The method 200 additionally includes locating an adhesive, such as an anisotropic conductive film, between the flex connector and an HGA connector at 206. In one implementation, locating the adhesive includes applying (e.g., depositing or printing) the adhesive onto one of flex connector or HGA connector, and then bringing the other one of the flex connector or HGA connector into contact with the adhesive. The method 200 further includes compressing the anisotropic conductive film between the flex connector and the HGA connector until electrically-conductive filaments of the anisotropic conductive film electrically couple together a flex pad of the flex connector and an HGA pad of the HGA connector at 208. Optionally, the method 200 may include activating the anisotropic conductive film, such as by curing the film or allowing the film to dry, while compressed between the flex connector and the HGA connector. The method 200 also includes operably coupling the HGA connector with the HGA. In one implementation, operably coupling the HGA connector with the HGA includes electrically coupling together the HGA connector and the HGA with an HGA tail.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:
1. A connector assembly, comprising:
   a head-gimbal assembly (HGA) connector, comprising:
      a pad support;
      an HGA pad coupled to the pad support; and
      an HGA trace coupled to the pad support and electrically coupled to the HGA pad;
   a flex connector, comprising:

a substrate, comprising a first side and a second side, wherein the first side is opposite the second side;
a flex pad coupled to the first side of the substrate;
a flex trace coupled to the second side of the substrate; and
a via extending through the substrate from the first side to the second side, wherein the via electrically couples the flex pad and the flex trace; and
an adhesive between the HGA connector and the flex connector, wherein the adhesive adheres the HGA pad of the HGA connector in electrical contact with the flex pad of the flex connector.

2. The connector assembly according to claim 1, wherein:
the HGA pad of the HGA connector has a first total width;
the flex pad of the flex connector has a second total width; and
the first total width is less than the second total width.

3. The connector assembly according to claim 2, wherein the first total width is about one-sixth of the second total width.

4. The connector assembly according to claim 1, wherein a first total length of the HGA pad is equal to a second total length of the flex pad.

5. The connector assembly according to claim 1, wherein a first total length of the HGA pad is less than a second total length of the flex pad.

6. The connector assembly according to claim 1, wherein:
the HGA connector further comprises a plurality of HGA pads coupled to the pad support and spaced apart in a first direction;
the flex connector further comprises a plurality of flex pads coupled to the first side of the substrate and spaced apart in the first direction;
a first total length of each HGA pad of the plurality of HGA pads is different; and
a second total length of each flex pad of the plurality of flex pads is the same.

7. The connector assembly according to claim 1, wherein the substrate of the flex connector is interposed between the HGA pad of the HGA connector and the flex trace of the flex connector.

8. The connector assembly according to claim 1, wherein:
the flex connector further comprises a land coupled to the second side;
the land electrically couples the via and the flex trace; and
the land is wider than the via and the flex trace.

9. The connector assembly according to claim 8, wherein:
the flex connector further comprises at least two vias extending through the substrate from the first side to the second side;
the at least two vias electrically couple the flex pad and the flex trace; and
the land electrically couples the at least two vias and the flex trace.

10. The connector assembly according to claim 1, wherein:
the pad support comprises a through-slot; and
the HGA pad spans across the through-slot.

11. The connector assembly according to claim 1, wherein the pad support is made of a transparent material.

12. The connector assembly according to claim 1, wherein the adhesive comprises an anisotropic conductive film.

13. The connector assembly according to claim 12, wherein:
the anisotropic conductive film comprises electrically-conductive particles embedded within an electrically non-conductive material; and
the electrically-conductive particles of the anisotropic conductive film between the HGA pad and the flex pad establish electrical contact between the HGA pad and the flex pad.

14. The connector assembly according to claim 1, further comprising a secondary mechanical coupling configured to compress together the HGA connector and the flex connector.

15. The connector assembly according to claim 14, wherein:
the HGA connector further comprises a suspension arm to which the pad support is coupled such that the pad support is interposed between the suspension arm and the HGA pad;
the suspension arm comprises a first coupling element;
the substrate of the flex connector further comprises a second coupling element;
the secondary mechanical coupling comprises the first coupling element and the second coupling element; and
the first coupling element and the second coupling element are engageable via a fastener to compress together the HGA connector and the flex connector.

16. The connector assembly according to claim 1, wherein:
the HGA connector further comprises a first cover applied onto the pad support and over the HGA trace; and
the flex connector further comprises a second cover applied onto the second side of the substrate and over the flex trace.

17. A hard disk drive, comprising:
a carriage, comprising an arm;
a head-gimbal assembly (HGA) coupled to the arm of the carriage; and
a connector assembly, comprising:
a head-gimbal assembly (HGA) connector, operably coupled with the HGA and comprising:
a pad support;
an HGA pad coupled to the pad support; and
an HGA trace coupled to the pad support and electrically coupled to the HGA pad;
a flex connector, fixed onto the carriage and comprising:
a substrate, comprising a first side and a second side, wherein the first side is opposite the second side;
a flex pad coupled to the first side of the substrate;
a flex trace coupled to the second side of the substrate; and
a via extending through the substrate from the first side to the second side, wherein the via electrically couples the flex pad and the flex trace; and
an adhesive between the HGA connector and the flex connector, wherein the adhesive adheres the HGA pad of the HGA connector in electrical contact with the flex pad of the flex connector.

18. The hard disk drive of claim 17, further comprising a plurality of connector assemblies.

19. The hard disk drive of claim 17, further comprising an HGA tail electrically coupled with the HGA connector and fixed onto the arm of the carriage.

20. A method of making a hard disk drive, comprising:
coupling a head-gimbal assembly (HGA) to an arm of a carriage;
fixing a flex connector onto the carriage, wherein the flex connector comprises:
a substrate, comprising a first side and a second side, wherein the first side is opposite the second side;
a flex pad coupled to the first side of the substrate;

a flex trace coupled to the second side of the substrate; and a via extending through the substrate from the first side to the second side, wherein the via electrically couples the flex pad and the flex trace;

locating an anisotropic conductive film between the flex connector and an HGA connector, wherein the HGA connector comprises:

a pad support;

an HGA pad coupled to the pad support; and an HGA trace coupled to the pad support and electrically coupled to the HGA pad;

compressing the anisotropic conductive film between the flex connector and the HGA connector until electrically-conductive filaments of the anisotropic conductive film electrically couple together the flex pad of the flex connector and the HGA pad of the HGA connector; and operably coupling the HGA connector with the HGA.

* * * * *